(12) United States Patent
Symons et al.

(10) Patent No.: US 8,321,473 B2
(45) Date of Patent: Nov. 27, 2012

(54) OBJECT CUSTOMIZATION AND MANAGEMENT SYSTEM

(75) Inventors: Matthew Symons, Oakland, CA (US); Anatoly Roytman, Weston, MA (US)

(73) Assignee: Accenture Global Services Limited, Dublin (IE)

(*) Notice: Subject to any disclaimer, the term of this patent is extended or adjusted under 35 U.S.C. 154(b) by 0 days.

(21) Appl. No.: 12/853,860

(22) Filed: Aug. 10, 2010

(65) Prior Publication Data

US 2011/0055254 A1  Mar. 3, 2011

Related U.S. Application Data

(60) Provisional application No. 61/238,401, filed on Aug. 31, 2009.

(51) Int. Cl.
*G06F 17/30* (2006.01)

(52) U.S. Cl. ........ 707/803; 707/791; 707/792; 707/793; 707/794; 707/797; 707/798; 707/799; 707/800; 707/801; 707/802; 707/804; 707/805; 707/809; 707/812; 705/1; 705/10; 709/203

(58) Field of Classification Search .................. 707/791, 707/792, 793, 794, 797, 798, 799, 800, 801, 707/803, 804, 802, 805, 809, 812, 999.101, 707/999.102; 705/1, 10; 709/203
See application file for complete search history.

(56) References Cited

U.S. PATENT DOCUMENTS

| 6,714,975 B1 | 3/2004 | Aggrarwal et al. |
|---|---|---|
| 2001/0021935 A1* | 9/2001 | Mills .............................. 707/513 |
| 2002/0032597 A1* | 3/2002 | Chanos ........................... 705/10 |
| 2006/0074769 A1 | 4/2006 | Looney et al. |
| 2006/0179033 A1 | 8/2006 | Stanke et al. |
| 2007/0055689 A1 | 3/2007 | Rhoads et al. |
| 2007/0067371 A1 | 3/2007 | Allan et al. |
| 2007/0073776 A1 | 3/2007 | Kalalian et al. |
| 2008/0154987 A1 | 6/2008 | Kottomtharayil et al. |
| 2009/0106234 A1 | 4/2009 | Siedlecki et al. |
| 2009/0210486 A1* | 8/2009 | Lim .............................. 709/203 |
| 2009/0276317 A1 | 11/2009 | Dixon et al. |

(Continued)

FOREIGN PATENT DOCUMENTS

JP   03178078 A   6/2003

(Continued)

OTHER PUBLICATIONS

Swisher, Peter Simeon, "The managed web: A look at the impact of Web 2.0 on media asset management for the enterprise" Journal of Digital Asset Management vol. 3, 1 32-42, 2007.

(Continued)

*Primary Examiner* — Syling Yen
(74) *Attorney, Agent, or Firm* — Mannava & Kang, P.C.

(57) ABSTRACT

An Object Customization and Management (OCM) system is configured to identify an object for creating a website based on a business objective. The OCM system includes a customizing module configured to determine qualitative attribute categories for a plurality of objects operable to be used in websites. The module assigns the plurality of objects to the qualitative attribute categories. The OCM system also includes a data management module configured to receive a request for one of the plurality of objects to be used to achieve the business objective. This module also matches the business objective with one of the qualitative attribute categories, and selects an object in the matched qualitative attribute category for the request.

13 Claims, 6 Drawing Sheets

U.S. PATENT DOCUMENTS

2009/0297065 A1 * 12/2009 Matraszek et al. ............ 382/305

FOREIGN PATENT DOCUMENTS

| JP | 2006-221352 A | 8/2006 |
| KR | 1998-079647 A | 11/1998 |
| WO | 2004061708 | 7/2004 |
| WO | 2007094537 A1 | 8/2007 |
| WO | 2008/079249 A2 | 7/2008 |
| WO | 2008/094712 A2 | 8/2008 |
| WO | 2009091995 A2 | 7/2009 |

OTHER PUBLICATIONS

Natu, S. et al., "Digital Asset Management Using a Native XML Database Implementation", Proceedings of the 4th Conference on Information Technology curriculum CITC4'03, Oct. 2003.

* cited by examiner

OBJECT CUSTOMIZATION AND MANAGEMENT SYSTEM

PRIORITY

This application claims priority to U.S. Provisional Patent Application Ser. No. 61/238,401, filed Aug. 31, 2009, entitled "Digital Asset Customization System", by Symons et al., which is incorporated by reference in its entirety.

BACKGROUND

A digital asset management (DAM) system typically includes computer software and hardware which assists or facilitates the performance of digital asset management tasks. These tasks may include the ingestion, annotation, cataloging, storage, retrieval and distribution of digital assets. The digital assets being managed are collected and stored in a digital format. The digital assets may be annotated and cataloged using metadata associated with the individual assets or associated with groups of assets. The metadata tagged with the assets can describe, but is not limited to, a static description of the assets, the history of the assets, current ownership, current rights of use and/or access, object sizes, medias used, etc.

Ingestion, in a digital asset management context, is the process of introducing digital assets into a DAM system. This process includes assigning descriptive terms or values to the digital asset metadata. By assigning these to the metadata, it allows the digital assets to be found within the DAM system which stores them in a way in which they can be accessed by the DAM system users. Ingestion may also include a phase such as converting non-digital format information into a digital format. Ingestion may also include a phase of tagging rights of use to incoming digital assets.

A DAM system may manage a set of digital assets, such as images, textual content, and other types of components which are available to DAM system users. A user may be a web developer creating a website. The DAM system stores the digital assets by type, such as HTML header, style sheet, image description, etc. Also, the DAM system may store static attributes for the digital assets, such as file type, image size, creation date, etc. Web developers may select certain generic digital assets from a DAM system database based on their static attributes and use the selected generic digital assets in constructing a website.

A DAM system may be satisfactory for creating generic websites, and is often used by web developers for creating websites for companies or other entities. However, using digital assets, described merely in terms of static attributes such as image description, file type, image size, creation date, and other similar criteria may not be the best approach to providing an optimum website. This is especially true, when the website is trying to invoke an action, such as online purchases, from a target group of. For example, generic promotional and product information displayed on a website may be disconnected from a target visitor's interests. This can occur if the web developer constructs the website by selecting digital assets based on generic and/or static property descriptions, and may result in an unfavorable experience for the target visitor.

Furthermore, target customer preferences and the average responses by a target customer group in responding to content on a website tends to change over time. This may be caused by changes occurring in social customs or new norms of behavior being adopted by the population within different market segments. Thus, the criteria as to what is considered desirable within a market segment may change on a regular basis. As a result, there is a constant struggle for website owners to manage the relationship between total visits to their website, to maximize the appeal the website content has on targeted types of visitors among the total visitors to the website, and achieving a desired outcome through use of the selected content in a website. Furthermore, the struggle to manage the website is exasperated by the selection of generic digital assets for the website.

BRIEF SUMMARY OF THE INVENTION

One embodiment of the disclosure presents an Object Customization and Management (OCM) system configured to manage digital objects. The OCM system includes a customizing module configured to determine qualitative attribute categories for a plurality of objects operable to be used in websites, and assign the plurality of objects to the qualitative attribute categories. The OCM system also includes a data management module executed by a computer system and configured to receive a request for one of the plurality of objects to be used to achieve a business objective, match the business objective with one of the qualitative attribute categories, and select an object in the matched qualitative attribute category for the request.

A second embodiment of the disclosure presents a method for identifying an object for a business objective. The method includes determining qualitative attribute categories for a plurality of objects operable to be used in websites and receiving a request for one of the plurality of objects to be used to achieve the business objective. The method also includes matching the business objective with one of the qualitative attribute categories and selecting, by a computer system, an object in the matched qualitative attribute category for the request.

A third embodiment of the disclosure presents a non-transitory computer readable medium storing computer readable instructions that when executed by a computer system perform a method for identifying an object for a business objective. The method includes determining qualitative attribute categories for a plurality of objects operable to be used in websites and receiving a request for one of the plurality of objects to be used to achieve the business objective. The method also includes matching the business objective with one of the qualitative attribute categories and selecting, by a computer system, an object in the matched qualitative attribute category for the request.

BRIEF DESCRIPTION OF DRAWINGS

Embodiments are described in detail in the following description with reference to the following figures.

DETAILED DESCRIPTION OF EMBODIMENTS

Figure 1:
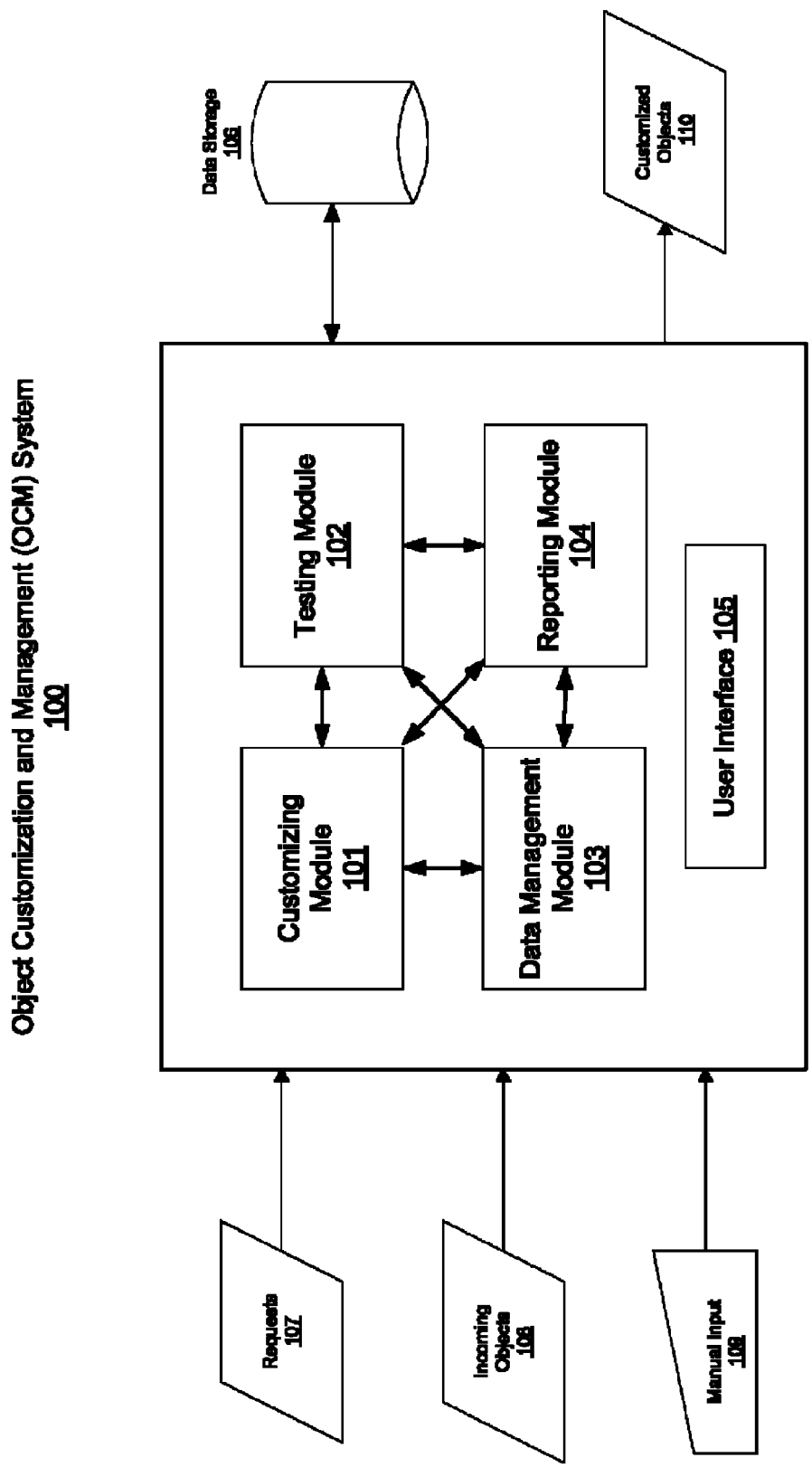
FIG. 1 illustrates an Object Customization and Management (OCM) system, according to an embodiment.

For simplicity and illustrative purposes, the principles of the embodiments are described by referring mainly to examples thereof. In the following description, numerous specific details are set forth in order to provide a thorough understanding of the embodiments. It is apparent however, to one of ordinary skill in the art, that the embodiments may be practiced without limitation to these specific details. In some instances, well known methods and structures have not been described in detail so as not to unnecessarily obscure the embodiments. Furthermore, different embodiments are described below. The embodiments may be used or performed together in different combinations.

According to an embodiment, an Object Customization and Management (OCM) system is provided which is useful in ingesting and customizing objects which are also stored in the OCM system. An object is any type or form of digital content or media. Examples of objects may include video, digital pictures, music files, banners, text, graphics, etc. Objects may be combined to form a compilation. For example, a website may be comprised of multiple objects.

The OCM system customizes objects by tagging the objects with information. Tagging may include associating the information with the object, such as storing the information as metadata for the object. The tagged information may identify a qualitative category and a business object for each object. The OCM system may validate the tagged information. For example, the OCM system tests whether an object has or invokes a qualitative attribute for a category and whether the object can achieve the business objective, such as to achieve a sale. These validation processes can be done separately, together and in any sequence. The tagged information is generally stored in metadata associated with the customized objects. The effectiveness of the OCM system is enhanced to provide customized objects having a confirmed appeal for specific target customer preferences or market segments. The OCM system also provides customized objects to accomplish specified business objectives associated with specific target customer preferences or market segments.

Furthermore, the metadata of the customized objects in the OCM system is updated with feedback data based on successful marketing applications using the customized objects from the OCM system. Thus, the accuracy of the metadata tagged to the customized objects in the OCM system is maintained or increases over time, rather than degrading over time, as would otherwise generally occur.

Customized objects can also be matched with business objectives. Matches may be included in the tagged metadata for the objects. This tagging allows the OCM system to provide customized objects, as needed, in response to a request to achieve a predetermined business objective. Furthermore, the customized objects may be matched with customer attributes to create different customized objects which would be of greater interest to customers associated with the attributes. Examples of different types of customized objects include a web page or other website content, electronic promotions which may be provided to users online, via email, SMS text or through other channels, or any other digital information that may be provided to users.

Examples of a business objective to be achieved by the customized objects include maximizing online sales, increasing customer exposure to other products for up-sales/cross-sales, etc. The customized objects are tagged with information relating to validated characteristics of the customized objects by which they can appeal to certain user preferences or market segments. Also, customized objects are tagged with information relating to the validated effectiveness of the customized objects for accomplishing defined business objectives with respect to the user preferences or market segments.

By updating the metadata tagged to customized objects, the collective tagged information associated with all the customized objects in the OCM system accumulates over time. This can be accomplished through modifying the tagged metadata with validation data obtained through processes such as pre-market testing or recording the history of actual marketing efforts regarding the effectiveness of the customized objects. Thus, the OCM system, with its stored customized objects, changes and grows. As the OCM system is utilized, and the customized objects in its database are deployed, the OCM system database including the customized objects associated with the OCM system becomes enhanced for future users of the OCM system. This is accomplished by providing a variety of customized objects which are updated based upon any usage of the customized objects in the OCM system database for various marketing functions and/or various business objectives.

FIG. 1 illustrates an Object Customization and Management (OCM) system 100, according to an embodiment, which is operable to customize incoming objects 108. The OCM system 100 includes a customizing module 101, a testing module 102, a data management module 103, a reporting module 104, a user interface 105 and a data storage 106. A module may include software, hardware, or a combination of both. Examples of the incoming objects 108 include images, text strings, banners, video, documents, multimedia files, etc. The incoming objects 108 may be used in various combinations to create customized objects 110. Customized objects 110 may also be constructed using other customized objects 110 as components.

The data storage 106 includes a data storage device that stores data organized in a manner which allows desired data, including customized objects 110, to be easily retrieved. For example, the data storage 106 may include a relational database or an online analytical processing (OLAP) system for retrieving data. The customized objects 110 stored in the data storage 106 can be organized by category according to qualitative attributes. The customized objects 110 stored in the data storage 106 can also be organized as associated with certain business objectives.

A qualitative attribute can generally relate to almost any quality or attribute associated with an object. In the OCM system 100, a qualitative attribute can be a basis for constructing customized objects 110 pursuant to a request 107. A qualitative attribute may identify an emotional response or a perception of a user stimulated by viewing or listening to the object. For instance, if an object tends to stimulate an inspirational feeling in an average target customer, then the object has an inspirational qualitative attribute. Similarly, if an object provokes an emotional response to seek a safe condition or outcome by a viewer, then the object has a safety seeking qualitative attribute. Other emotional responses that can be associated with a qualitative attribute include family-based emotions, environmental concern-based emotions, social responsibility-based emotions, etc. Qualitative attributes can also be associated with one or more predetermined marketing functions. For example, a qualitative attribute may be inspirational for selling a product.

The qualitative attribute may also identify a recommended use for an object. An example of a recommended use for the qualitative attribute is if the objects are considered desirable for use in a particular geographical region. Another example of a qualitative attribute is that the objects are recommended for a demographic, such as appealing to teenagers. Yet another example is that the objects are recommended for use in promotions for a particular season or event. Qualitative attributes for the objects may also be associated with more specific customer profiles. For example, the qualitative attribute for a particular object may identify the object as best used for males, ages 21-30, for sales or promotions of alcoholic beverages.

The qualitative attributes may be grouped into categories. A category may be a qualitative attribute itself, such as inspiration, humorous or patriotic, or may be associated with a use, such as sales, etc. Other examples of categories may include safety seeking, environmental, etc. The qualitative attributes and the categories may be identified by experts.

Qualitative attributes for objects, once they are validated as correctly applied to specific objects, may be included in metadata for the objects to create customized objects 110. A validation process for validating that a qualitative object is correctly associated with an object may be performed by the testing module 102. The validation process can be accomplished through many different types of methods, either used separately or in combination. These include premarket testing performed prior to actual marketing. Validation data may also be obtained based on actual market performance. Automated systems and methods for performing multivariate testing of objects are described in U.S. Pat. Nos. 6,934,748 and 7,308,497, which are hereby incorporated by reference in their entirety, and may be used by the testing module 102. These patents describe automated methods for generating and gathering observation data relating to user behaviors in response to different types of online content.

A business objective, in general, is a goal that an entity can set for itself. For example, goals based on profitability, sales growth, or return on investment are all business objectives. In the OCM system 100, the business objective can be a basis for constructing the customized objects 110 pursuant to the request 107. An example of a business objective is increasing sales to a market segment or target customer profile through a deployment of the customized objects 110. Another example of a business objective is improving up-sales or cross-sales for related products through a deployment of the customized objects 110. Similar to the validation process for qualitative attributes, a business objective for a customized object 110 may be validated through performing premarket testing prior to actual marketing, or may be validated based on data from actual market performance.

The customizing module 101 tags or otherwise associates one or more qualitative attributes with objects forming the customized objects 110. The qualitative attributes may be stored in the data storage 106 as metadata associated with the customized object 110. A categorization process may be performed to determine the most relevant qualitative attributes for incoming objects 108. A testing standard may also be used in the testing module 102 to determine and apply a qualitative attribute category to specific incoming objects 108 for associating them with a qualitative attribute.

To illustrate one process for the initialization of incoming objects 108, qualitative attributes from an initial set of provisional qualitative attribute categories are applied to a set of incoming objects 108 having no previously assigned qualitative attribute category. The initial set of qualitative attribute categories can be predefined in the OCM system 100, or identified externally and entered, via manual input 109 or by any type of automated input (not shown), to be applied to the set of incoming objects 108. According to an embodiment, in tagging the set of objects, an exemplary goal is to assign at least approximately 80% of the incoming objects 108 in the set to a minimal number of qualitative attribute categories. As an example, a set of 500 incoming objects 108 enters the OCM system 100. Out of the total of 500, about 400 of these objects are assigned to 2-6 different qualitative attribute categories. If this is the first time these objects are assigned any qualitative attribute category, then the assigned category is a primary qualitative attribute category for the objects. A second category assigned to an object is a secondary qualitative attribute category for the object. A third, if applied, is a tertiary qualitative attribute category for the object, and so on.

Each qualitative attribute category is associated with at least one qualitative attribute. The tagging of the objects 108 is then tested to determine the accuracy of the categories as applied to the tagged objects. The testing can be performed in various ways as described above. For instance, the testing can be automated using an algorithm which analyzes tagged objects against a set of criteria. Testing may also be performed manually to gathering testing data based on responses by a test audience.

Regardless of the process used for testing, one purpose for the testing includes seeking or measuring a marketing activity correlation between the tagged objects and the qualitative attribute category applied to the tagged objects. By testing the tagged objects, the testing generates data establishing a marketing activity correlation that validates a qualitative attribute category as being correctly or accurately applied to the tagged objects. This confirms the tagged objects as being customized objects 110, and operable to implement a marketing function associated with the qualitative attribute. If the marketing activity correlations demonstrate the categories as applied to the tagged objects as accurate, the tagged objects are stored as marketing activity correlated customized objects 110 associated with the OCM system 100. The process of categorization can be performed repeatedly such that the customized objects 110 are tagged with multiple qualitative attribute categories.

The OCM system 100 can further customize objects 110 based on a business objective. Once validated, these customized objects 110, which are customized based on the business objective, are stored in the data storage 106 with the business objective validation stored in the metadata associated with the customized objects 110. The OCM system 100 can produce customized objects 110 validated, based on the business objective, through different processes. The OCM system 100 first receives the request 107 for a customized object 110 for the business objective. Then, based on the specifications in the request 107, the OCM system 100 selects one or more customized objects 110 which are tagged with one or more qualitative attribute categories matching the specifications of the request 107. In another embodiment, the OCM system 100 constructs one or more new customized objects 110, pursuant to the specifications in request 107, incorporating into the newly constructed customized objects 110 one or more customized objects 110 previously stored in the data storage 106. In yet another embodiment, the OCM system 100 sends an external request to an outside developer (not shown) to send new incoming objects 108 having qualitative attributes assigned by the outside developer pursuant to the qualitative attributes of the specifications in the request 107 for a customized object 110 to fulfill the business objective. In this embodiment, the OCM system 100 validates the incoming objects 108 and utilizes these new validated objects as customized objects 110 to construct objects to fulfill the business objective according to the specifications in the request 107.

The data storage 106 may also store rules for including customized objects 110 associated with profiles for users. Attributes from the user profiles may be matched with qualitative attributes of the customized objects 110 when constructing them. Also, the data storage 106 may store templates for new customized objects 110 that comprise a predetermined set of previously validated customized objects 110. The templates, for example, may be for a product line or a particular brand.

The customizing module 101 determines which objects to include in a customized object 110 based on the business objective. For example, an object is included in the customized object 110 if the object's qualitative attribute category indicates that the object may be beneficial to achieve the business objective. This may be determined by matching the business objective with customized objects 110 which are categorized as having qualitative attributes matching the business objective or classified and stored with metadata identifying the same or similar business objectives. The stored templates may be used to create the customized objects 110 for the business objective. And the template may be modified by including the appropriate objects to achieve the desired business objective. Also, if any rules are stored in the data storage 106 which are applicable to the customized objects 110 based on the business objective, the customizing module 101 may include objects in the customized objects 110 in compliance with the rules.

The OCM system 100 may also be used for dynamic modification of a web page to optimize a visitor's online experience. For example, the OCM system 100 receives information indicating that a particular visitor is requesting a web page. If attributes, for instance, associated with a user profile for the visitor, are stored in the data storage 106, those attributes are used to identify corresponding customized objects 110, and those customized objects 110 are included in the web page delivered to the visitor. Also, the OCM system 100 can meet website owner requirements when dynamically creating a web page. For example, if the business objective is increasing product sales for a particular product line, the OCM system 100 selects the customized objects 110 that have qualitative attributes for meeting the business objective.

The OCM system 100 is operable to receive feedback on the initial performance of a customized object 110. The performance may be a measure of how well the customized object 110 achieved the desired business objective. The performance data may be used to update or re-classify a previously stored customized object 110.

The OCM system 100 is also operable to request and receive incoming objects 108 or customized objects 110 (not shown as input) from developers, for example, via the user interface 105. Developers may create incoming objects 108 or customized objects 110 for uploading into the OCM system 100. The developers may hypothesize as to the correct categorization of qualitative attributes or business objectives for objects and indicate proposals for that categorization to the OCM system 100. Through feedback on actual performance of the customized objects 110, the proposed categorization, proposed qualitative attributes or proposed business objectives may be adjusted for these customized objects 110. Also, adjustments may be provided in response to new classifications or new granularities of classification.

An innovative compensation model may be used for developers. For example, performance-based compensation may be available to developers. The compensation is based on how well the customized objects 110 performed to achieve a desired business objective. In another example, a flat fee may be paid for different types of customized objects 110.

The OCM system 100 is also operable to identify customized objects 110 which are needed for certain business objectives. For example, the OCM system 100 may determine through performance feedback that no customized objects 110 previously stored in the data storage 106 are suitable for increasing sales of cosmetics to teenagers in the Midwest.

The OCM system 100 may generate a proposal to a predetermined set of developers or agencies indicating the desired customized objects 110 and the specified qualitative attributes for the desired customized objects 110. The developers may then develop and submit customized objects 110 in response to the proposal.

The OCM system 100 may also include the data management module 103 and the reporting module 104. The data management module 103 may be used, among other things, to store the incoming objects 108, the requests 107, and the manual input 109 received by the OCM system 100. The data management module 103 may be used to store the customized objects 110 received or constructed by the OCM system 100. The reporting module 104 can be used to retrieve and send the data stored on the storage device 106 to other systems within or associated with the entity having the OCM system 100. For instance, the data management module 103 can store objects received from outside developers but not yet validated by testing in a separate storage area (not shown). After these objects are validated, the reporting module 104 can send updated testing data relating to the previously untested objects to other systems within the entity having the OCM system 100.

Figure 2A:
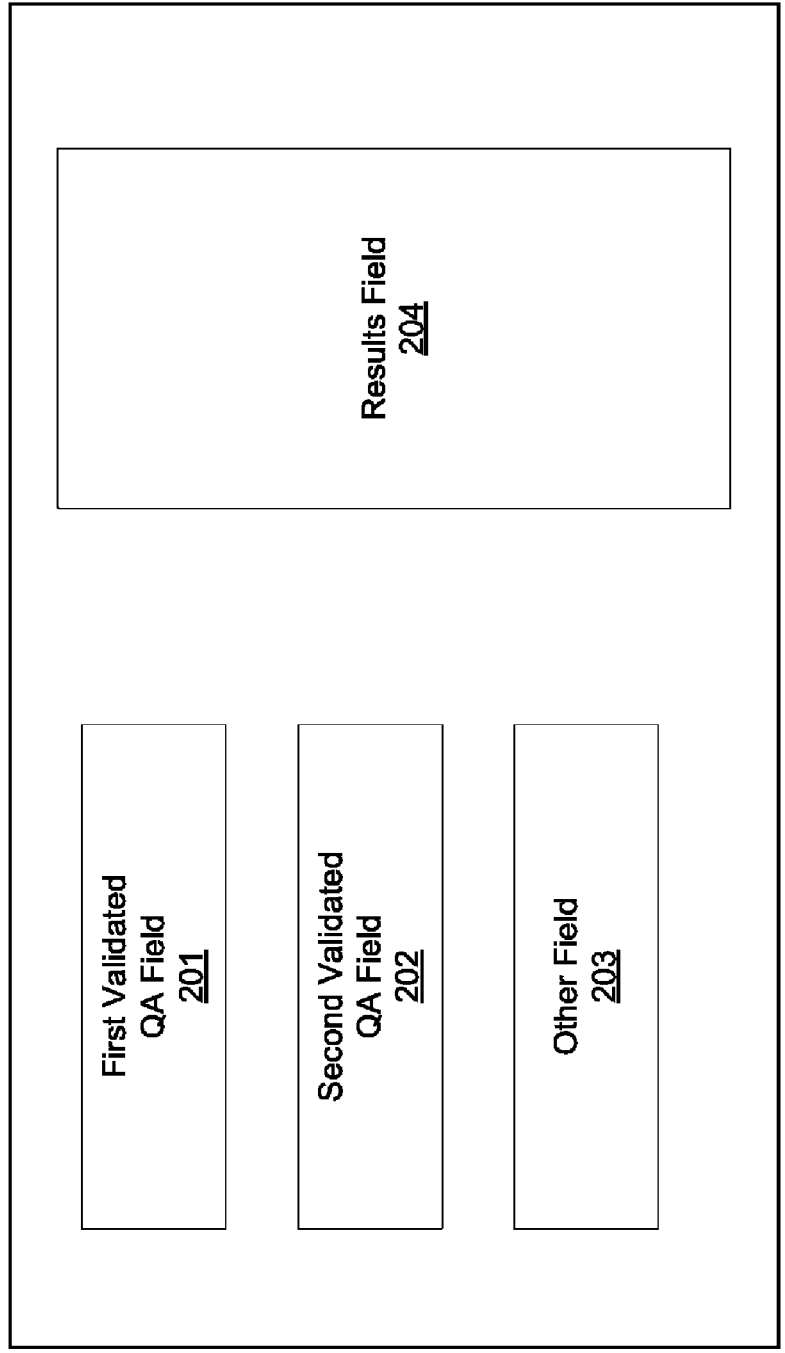
FIGS. 2A-2B illustrate screen shots of a user interface in an OCM system, according to an embodiment.
Figure 2B:
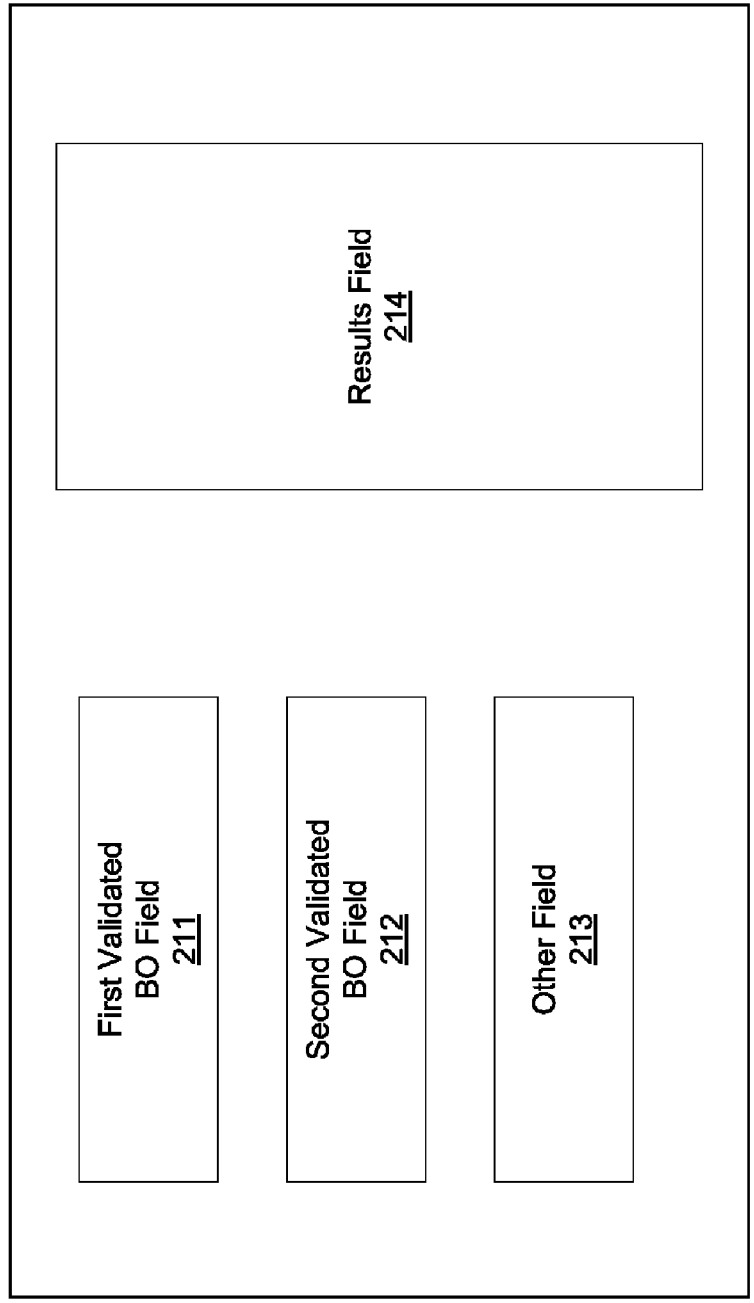

FIGS. 2A-B. show examples of screenshots that may be generated through the user interface 105.

FIG. 2A illustrates a screenshot menu for customization by qualitative attribute (QA) 200. This screen is used to query the data storage 106 for customized objects 110 meeting one or more criteria relating to different qualitative attributes. First validated QA field 201 is used for entry of a first query for the customized objects 110 meeting criteria for a first validated qualitative attribute. Second validated QA field 201 is used for entry of a second query for the customized objects 110 meeting criteria for a second validated qualitative attribute. Other field 203 is used for queries relating to other qualifiers, such as an aging or a source of the customized objects 110. Results field 204 displays the results of the input queries based on qualitative attributes for selected customized objects 110.

FIG. 2B illustrates a screenshot for customization by business objective (BO) 210. This screen is used to query the data storage 106 for customized objects 110 meeting one or more criteria relating to different business objectives. First validated BO field 211 is used for entry of a first query for customized objects 110 meeting criteria for a first validated business objective. Second validated BO field 211 is used for entry of a second query for customized objects 110 meeting criteria for a second validated business objective. Other field 213 is used for queries relating to other qualifiers, such as an aging or a source of the customized objects 110. Results field 214 is for the results of these one or more input queries for customized objects 110 by business objective.

Figure 3A:
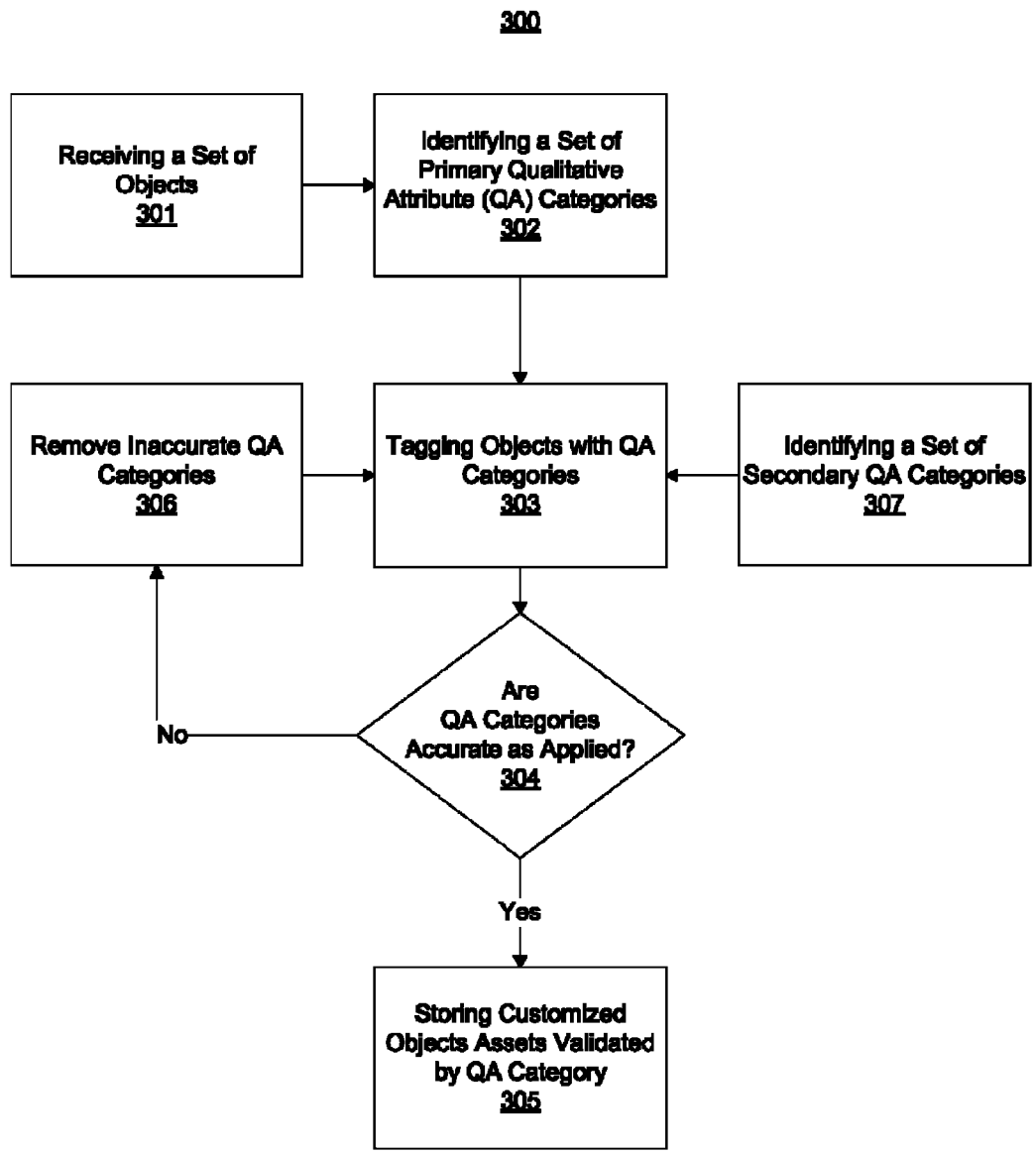
FIGS. 3A-3B illustrate a method for customizing objects using the OCM system shown in FIG. 1, according to an embodiment.
Figure 3B:
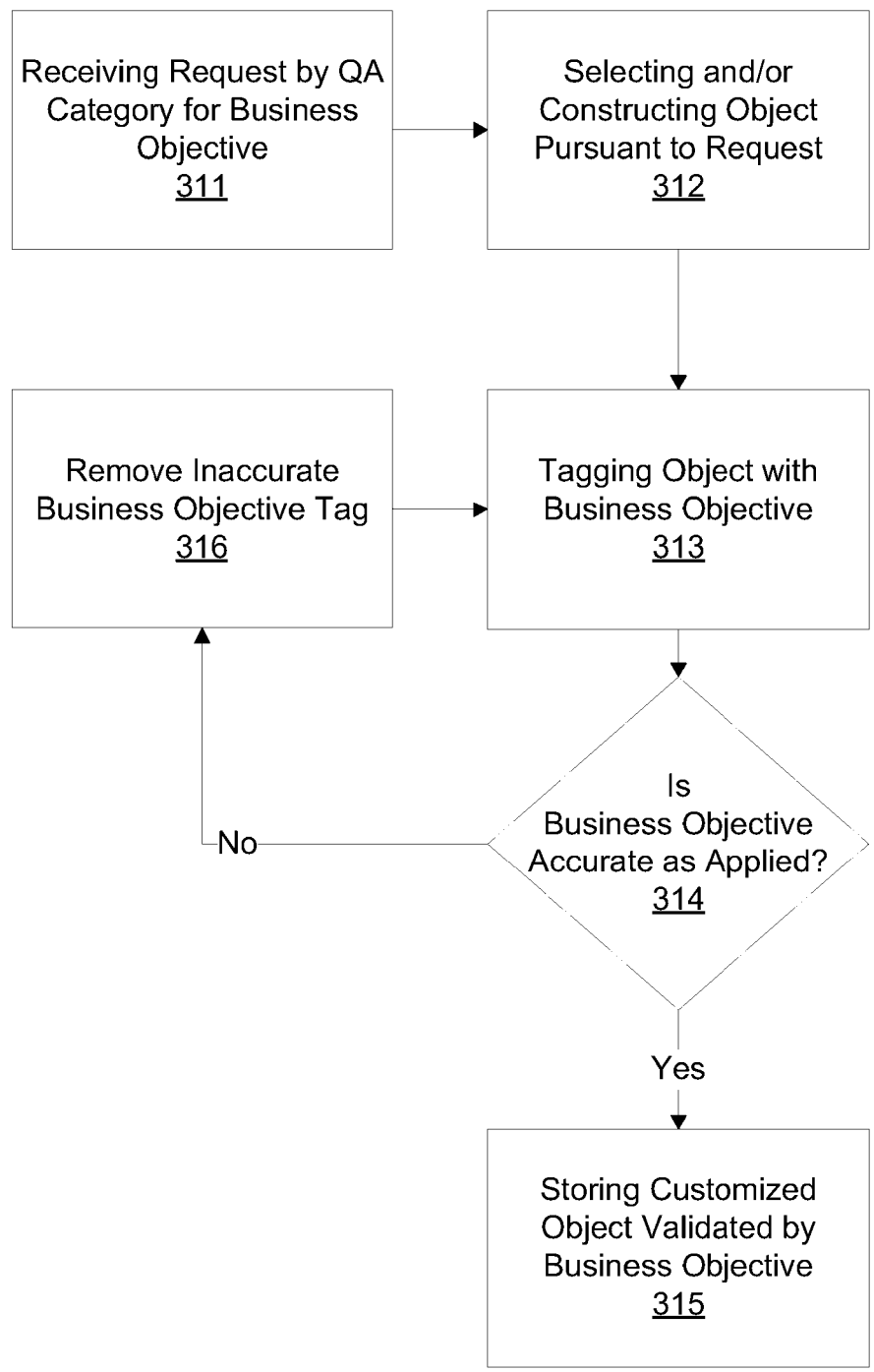

FIGS. 3A and 3B illustrate methods 300 and 310 for customizing objects, according to an embodiment. The methods 300 and 310 are described with respect to the OCM system 100 shown in FIG. 1 by way of example and not limitation, and these methods may be performed in other systems.

Referring to FIG. 3A, at step 301 the OCM system 100 receives incoming objects 108 for use in creating or constructing customized objects 110.

At step 302, the customizing module 101 in the OCM system 100 identifies a set of primary qualitative attribute categories. Each primary qualitative attribute category is associated with a qualitative attribute. The set of primary qualitative attribute categories can also be entered into the OCM system 100 by other ways, such as via manual input 109. The qualitative attributes may be grouped into categories. A category may be a qualitative attribute itself, such as inspiration, humorous or patriotic, or may be associated with a use, such as sales, etc. Other examples of categories may include safety seeking, environmental, etc.

At step 303, the customizing module 101 in the OCM system 100 tags the incoming objects 108 with a primary qualitative attribute category from the set of primary qualitative attribute categories.

At step 304, the testing module 102 in the OCM system 100 determines the accuracy of the primary qualitative attribute categories as applied to the tagged objects. For example, if the qualitative attribute or category is "humorous", a test is administered to determine whether a user is humored when viewing the object.

At step 305, the customizing module 101 in the OCM system 100 stores the tagged objects as customized objects 110 if the testing outcome is positive, e.g., invoking humor in the user.

In another circumstance, if the testing is negative, at step 306, the customizing module 101 in the OCM system 100 removes the inaccurate qualitative attribute category tagged to the objects so that these objects can potentially be retagged according to step 303.

Step 307 is included to illustrate that an object may be included in more than one category. At step 307, the customizing module 101 in the OCM system 100 identifies a set of secondary qualitative attribute categories. Each secondary qualitative attribute category is associated with a second qualitative attribute associated with an object. The set of secondary qualitative attribute categories can also be entered via manual input 109. Step 307 can proceed to step 303, in which the customizing module 101 in the OCM system 100 tags the previously validated customized objects 110 with a secondary qualitative attribute category from the set of secondary qualitative attribute categories. The secondary qualitative attributes are tested according to step 304 and stored according to step 305.

Referring to FIG. 3B, at step 311, the OCM system 100 receives a request 107 for an object associated with a business objective.

At step 312, the customizing module 101 selects or constructs the customized objects 110, pursuant to the request 107, by matching the business objective with one or more qualitative attribute customized objects 110. In one example of matching, the request 107 may include a business objective that included a qualitative attribute category. For example, the request 107 states, "identify an object to sell vehicles that is humorous." Then, the customizing module 101 matches the request with an object in the humorous category. Also, the categories may include business objective attributes, such as "vehicle sales". Then, the matching identifies an object from the vehicle sales category for the request 107. If there is no match, then the customizing module 101 may request more information for the request or a new category of qualitative attribute may be created for the request, such as a category for vehicle sales. The new category may be populated with objects through testing.

At step 313, the customizing module 101 tags the customized objects 110 with the business objective.

At step 314, the testing module 102 in the OCM system 100 determines the accuracy of the business objective applied to the customized objects 110, seeking a business objective correlation between the customized objects 110 and the received request 107 specifying the business objective. It does this by determining whether the business objective correlation validates the business objective applied to the customized objects 110 and confirms the customized objects 110 as operable to implement the business objective.

At step 315, the customizing module 101 in the OCM system 100 stores the tagged customized objects 110 as correlated by business objective and associated with the OCM system. It does this if the business objective correlations demonstrate the business objective as applied to the tagged objects 110 is accurate.

In another circumstance, if the business objective correlations are negative and demonstrate the business objective as applied to the tagged objects is not accurate, then at step 316, the customizing module 101 in the OCM system 100 removes the inaccurate business objective metadata as tagged to the customized objects 110 so that these can potentially be retagged according to step 313.

Technical effects associated with the OCM system 100 and the methods 300 and 310 include the collection of requests 107 and the production of customized objects 110 and an improved user interface 105 giving the user convenience when entering requests 107 regarding different customized objects 110 having various metadata tags. Another technical effect is the more economical use of memory in a computer system by allowing faster processing of requests 107 and manual input 109 regarding the customized objects 110 stored in the data storage 106.

The OCM system processes requests 107 using the metadata associated with customized objects 110 stored in the data storage 106. This provides a more efficient database search capability and higher speed processing of requests 107. The OCM system 100 achieves a minimal load of data processing. Also, the OCM system 100 provides a technical tool for efficient search, retrieval and evaluation of customized objects 110 stored in the data storage 106. Also, the arrangement of menu items and images on the screen shots 200 and 210 in the user interface 105 is determined by technical considerations aimed at enhancing the user ability to manage the technical task of choosing desirable customized objects 110 for websites or other marketing venues.

The functions/steps of processing the request 107 provide information to the user in the form of a technical tool for an intellectual task the user has to otherwise master. This contributes to the technical solution of a technical problem of efficient search, retrieval and evaluation of customized objects 110 for websites or other marketing venues. The easily used user interface 105 allows the user to grasp the availability of customized objects 110 for accomplishing the desired marketing function and/or business objective faster and more accurately, facilitating marketing activity, and thus resulting in an improved, continued man-machine interaction.

One or more of the steps and functions described herein and one or more of the components of the systems described herein may be implemented as computer code comprising computer readable instructions stored on a non-transitory computer readable medium, such as memory or another type of storage device. The computer code is executed on a computer system (e.g., the computer system 400 described below), for example, by a processor, application-specific integrated circuit (ASIC), or other type of circuit. The code may exist as software programs comprised of program instructions in source code, digital asset code, executable code or other formats.

Figure 4:
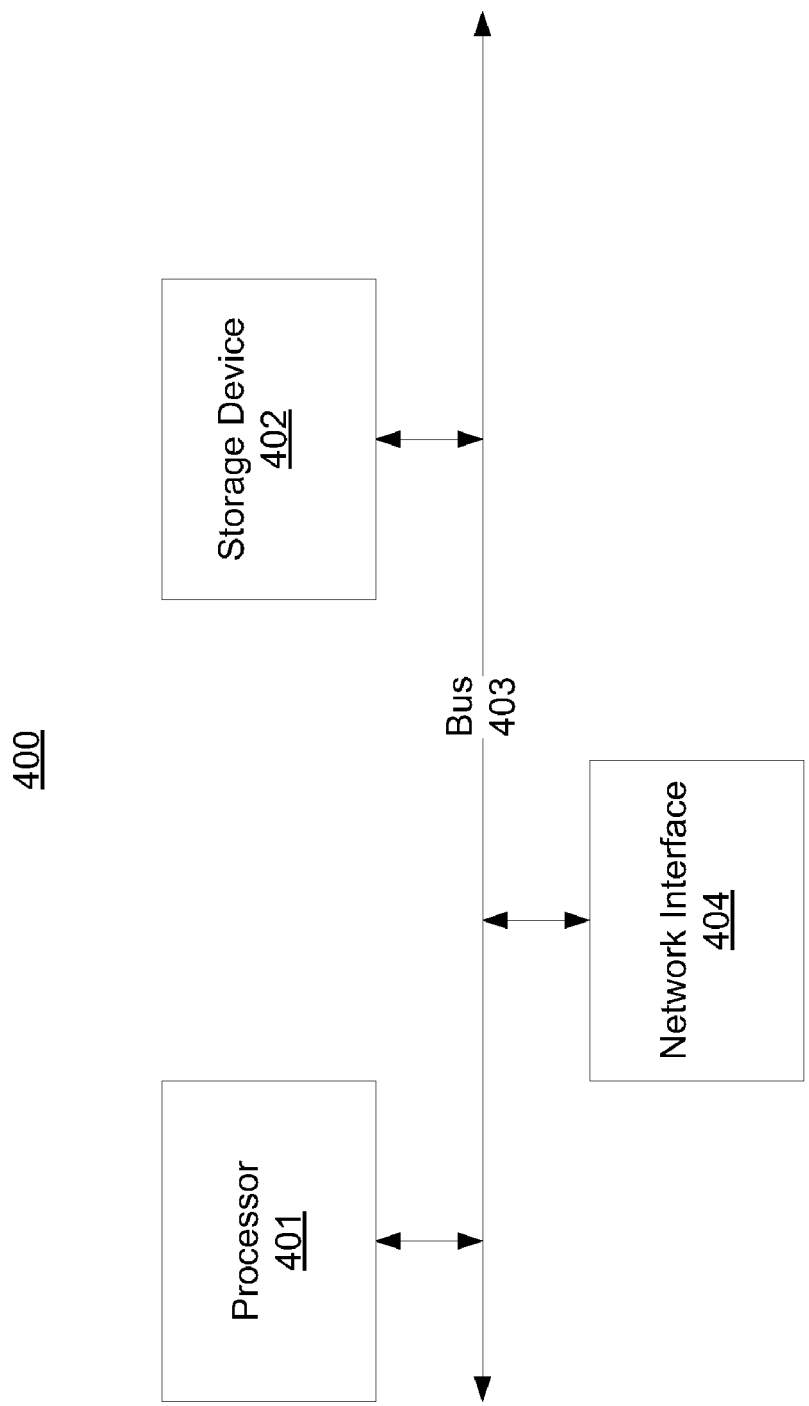
FIG. 4 illustrates a computer system configured to provide a hardware platform for the OCM system shown in FIG. 1, according to an embodiment.

FIG. 4 shows a computer system 400 that may be used as a hardware platform for the OCM system 100. The computer system 400 may be used as a platform for executing one or more of the steps, methods, and functions described herein that may be embodied as software stored on one or more computer readable storage devices, which are hardware storage devices.

The computer system 400 includes a processor 401 or processing circuitry that may implement or execute software instructions performing some or all of the methods, functions and other steps described herein. Commands and data from the processor 401 are communicated over a communication bus 403. The computer system 400 also includes a computer readable storage device 402, such as random access memory (RAM), where the software and data for processor 401 may reside during runtime. The storage device 402 may also include non-volatile data storage. The computer system 400 may include a network interface 404 for connecting to a network. It is apparent to one of ordinary skill in the art that other known electronic components may be added or substituted in the computer system 400.

Furthermore, the system and methods described herein are generally described with respect to objects customized with respect to qualitative attributes for achieving business objectives. However, the system and methods are applicable to other types of data files for other purposes.

While the embodiments have been described with reference to examples, those skilled in the art are able to make various modifications to the described embodiments without departing from the scope of the embodiments as described in the following claims, and their equivalents.

What is claimed is:

1. An Object Customization and Management (OCM) system to manage digital objects, the OCM system comprising:
a computer system that includes a data storage device and a processor, the computer system to:
generate customized objects, wherein to generate the customized objects further comprises:
associate information with the digital objects, and store the associated information as metadata for the digital objects; and
assign the customized objects to qualitative attribute categories, the customized objects to be used in websites, wherein each qualitative attribute category includes a qualitative attribute, wherein to assign the customized objects includes:
assign provisional qualitative attributes to the customized objects;
provisionally assign each customized object to qualitative attribute categories based on the assigned provisional qualitative attributes;
determine feedback data based on a marketing activity correlation established by testing or using the customized objects;
determine an accuracy of the provisionally assigned qualitative attributes categories as applied to each of the customized objects from the feedback data; and
modify the assignment of at least one of the customized objects based on the feedback data, wherein the modifying includes: removing the at least one customized object from one of the provisionally assigned qualitative attribute categories if the assignment is not validated based on the feedback data; and keeping the at least one customized object in the remaining provisionally assigned qualitative attribute categories if the assignment is validated based on the feedback data; and
process a request for a stored digital object to be used to achieve a business objective, wherein to process the request is to:
receive the request;
determine if one of the qualitative attribute categories matches the qualitative attribute and the business objective from the request;
if one of the qualitative attribute categories matches the qualitative attribute and the business objective from the request, select a customized object in the matched qualitative attribute category for the request; and
if not one of the qualitative attribute categories matches the qualitative attribute and the business objective from the request, create a new qualitative attribute category for the qualitative attribute and the business objective from the request and generate a request to create a new customized object for the new qualitative attribute category.

2. The OCM system of claim 1, wherein the processor is to test the customized objects to determine whether each of the customized objects matches a qualitative attribute or a business objective for the respective provisionally assigned qualitative attribute categories, and
determine the feedback data based on the testing.

3. The OCM system of claim 1, wherein the qualitative attribute for each customized object is an emotional response or a perception of a user stimulated by viewing the customized object.

4. The OCM system of claim 1, wherein the qualitative attribute for each customized object is a recommended use for the customized object.

5. The OCM system of claim 4, wherein the recommended use is for a geographic region.

6. The OCM system of claim 5, wherein the recommended use is for a demographic.

7. The OCM system of claim 2, wherein, to test the customized objects, the processor is to
use the customized objects in one or more websites, and
determine whether a visitor to the one or more websites performs an action associated with the business objective assigned to the qualitative attribute category for each customized object used in the one or more websites.

8. A method for identifying an object for a business objective, the method comprising:
generating customized objects, wherein generating the customized objects further comprises:
storing digital objects in a data storage device;
generating, by a processor, customized objects by associating information with the digital objects, and storing the associated information as metadata for the digital objects;
assigning the customized objects to qualitative attribute categories, the customized objects to be used in websites, wherein each qualitative attribute category includes a qualitative attribute, wherein the assigning of the plurality of customized objects includes:
assigning provisional qualitative attributes to the customized objects;
provisionally assigning each customized object to qualitative attribute categories based on the assigned provisional qualitative attributes;
determining feedback data based on a marketing activity correlation established by testing or using the customized objects;

determining an accuracy of the provisionally assigned qualitative attributes categories as applied to each of the customized objects from the feedback data; and modifying the assignment of at least one of the customized objects based on the feedback data, wherein the modifying includes: removing the at least one customized object from one of the provisionally assigned qualitative attribute categories if the assignment is not validated based on the feedback data; and keeping the at least one customized object in the remaining provisionally assigned qualitative attribute categories if the assignment is validated based on the feedback data; and processing a request for a stored digital object to be used to achieve a business objective, wherein the processing includes:

receiving the request;

identifying a qualitative attribute and the business objective from the request;

determining if one of the qualitative attribute categories matches the qualitative attribute and the business objective from the request;

if one of the qualitative attribute categories matches the qualitative attribute and the business objective from the request, selecting a customized object in the matched qualitative attribute category for the request; and if not one of the qualitative attribute categories matches the qualitative attribute and the business objective from the request, creating a new qualitative attribute category for the qualitative attribute and the business objective from the request and generating a request to create a new customized object for the new qualitative attribute category.

9. The method of claim 8, wherein the testing comprises:

testing the customized objects to determine whether each of the customized objects match the business objectives for the respective provisionally assigned qualitative attribute categories; and determining the feedback data based on the testing.

10. The method of claim 9, wherein the testing comprises:

using the customized objects in one or more websites; and determining whether a visitor to the one or more websites performs an action associated with the business objective assigned to the qualitative attribute category for each customized object used in the one or more websites.

11. A non-transitory computer readable medium storing computer readable instructions that when executed by a computer system identify an object for a business objective, the computer readable instructions to:

generate and store customized objects, wherein to generate and store customized objects is to:

associate information with the digital objects as metadata for the digital objects;

assign the customized objects to qualitative attribute categories, the customized objects to be used in websites, wherein each qualitative attribute category includes a qualitative attribute, wherein to assign the customized objects includes:

assign provisional qualitative attributes to the customized objects;

provisionally assign each customized object to qualitative attribute categories based on the assigned provisional qualitative attributes;

determine feedback data based on a marketing activity correlation established by testing or using the customized objects;

determine an accuracy of the provisionally assigned qualitative attributes categories as applied to each of the customized objects from the feedback data; and modify the assignment of at least one of the customized objects based on the feedback data, wherein the modifying includes: removing the at least one customized object from one of the provisionally assigned qualitative attribute categories if the assignment is not validated based on the feedback data; and keeping the at least one customized object in the remaining provisionally assigned qualitative attribute categories if the assignment is validated based on the feedback data; and process a request for a stored digital object to be used to achieve a business objective, wherein to process the request is to:

receive the request;

determine if one of the qualitative attribute categories matches the qualitative attribute and the business objective from the request;

if one of the qualitative attribute categories matches the qualitative attribute and the business objective from the request, select a customized object in the matched qualitative attribute category for the request; and if not one of the qualitative attribute categories matches the qualitative attribute and the business objective from the request, create a new qualitative attribute category for the qualitative attribute and the business objective from the request and generate a request to create a new customized object for the new qualitative attribute category.

12. The computer readable medium of claim 11, wherein the instructions to determine feedback data based on a marketing activity correlation established by testing comprises instructions to:

test the customized objects to determine whether each of the customized objects matches a quantitative attribute or a business objective for the respective provisionally assigned qualitative attribute categories; and determine the feedback data based on the testing.

13. The computer readable medium of claim 12, wherein the instructions to test comprises:

using the customized objects in one or more websites; and determining whether a visitor to the one or more websites performs an action associated with the business objective assigned to the qualitative attribute category for each customized object used in the one or more websites.

* * * * *